Feb. 4, 1930.                    T. W. ROSS                    1,745,867
                          ELECTRICAL PROTECTIVE SYSTEM
                             Filed Oct. 1, 1926        2 Sheets-Sheet 1
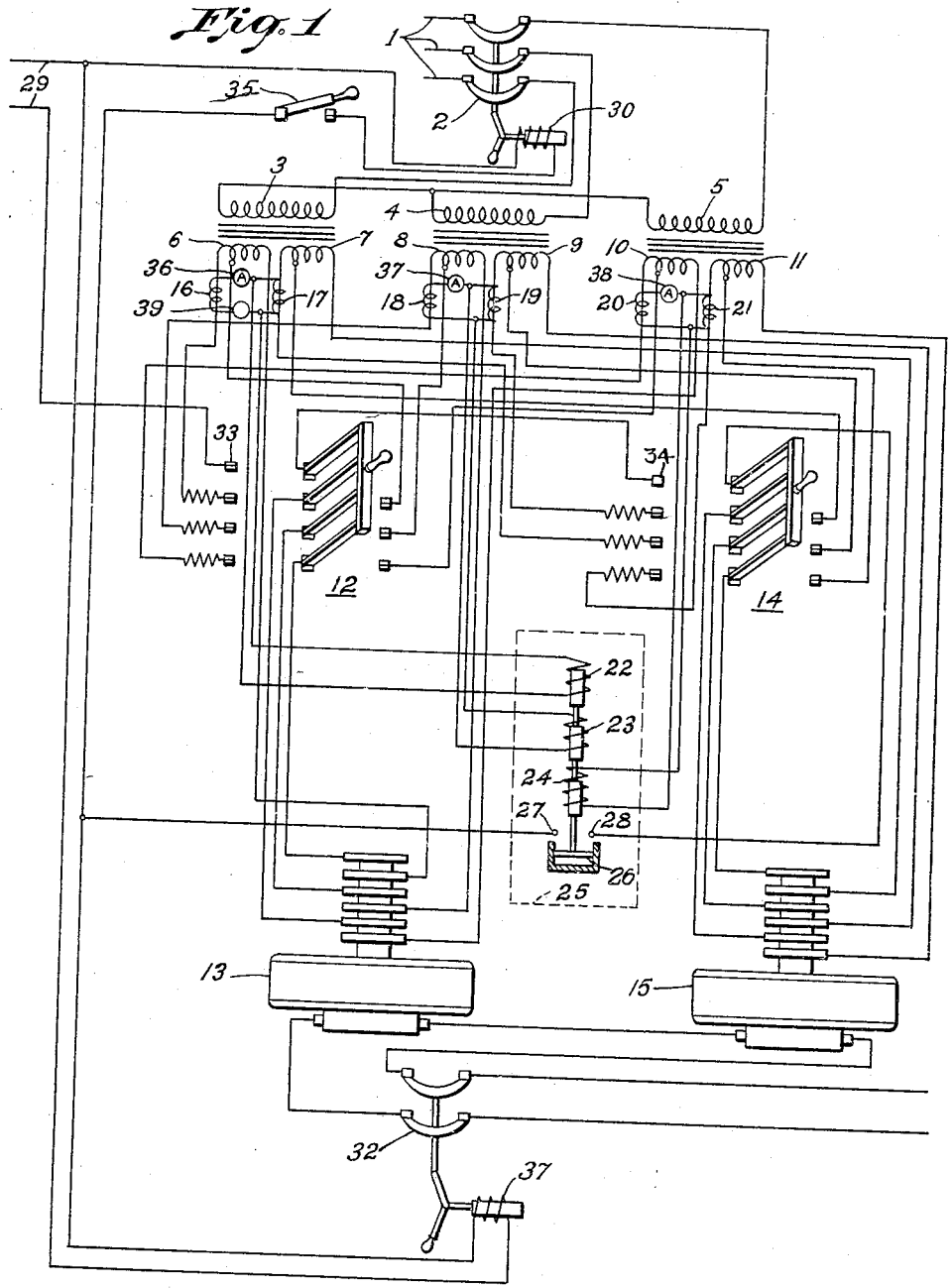
WITNESSES:                                              INVENTOR
                                                      Thomas W. Ross.
                                                           BY
                                                                ATTORNEY

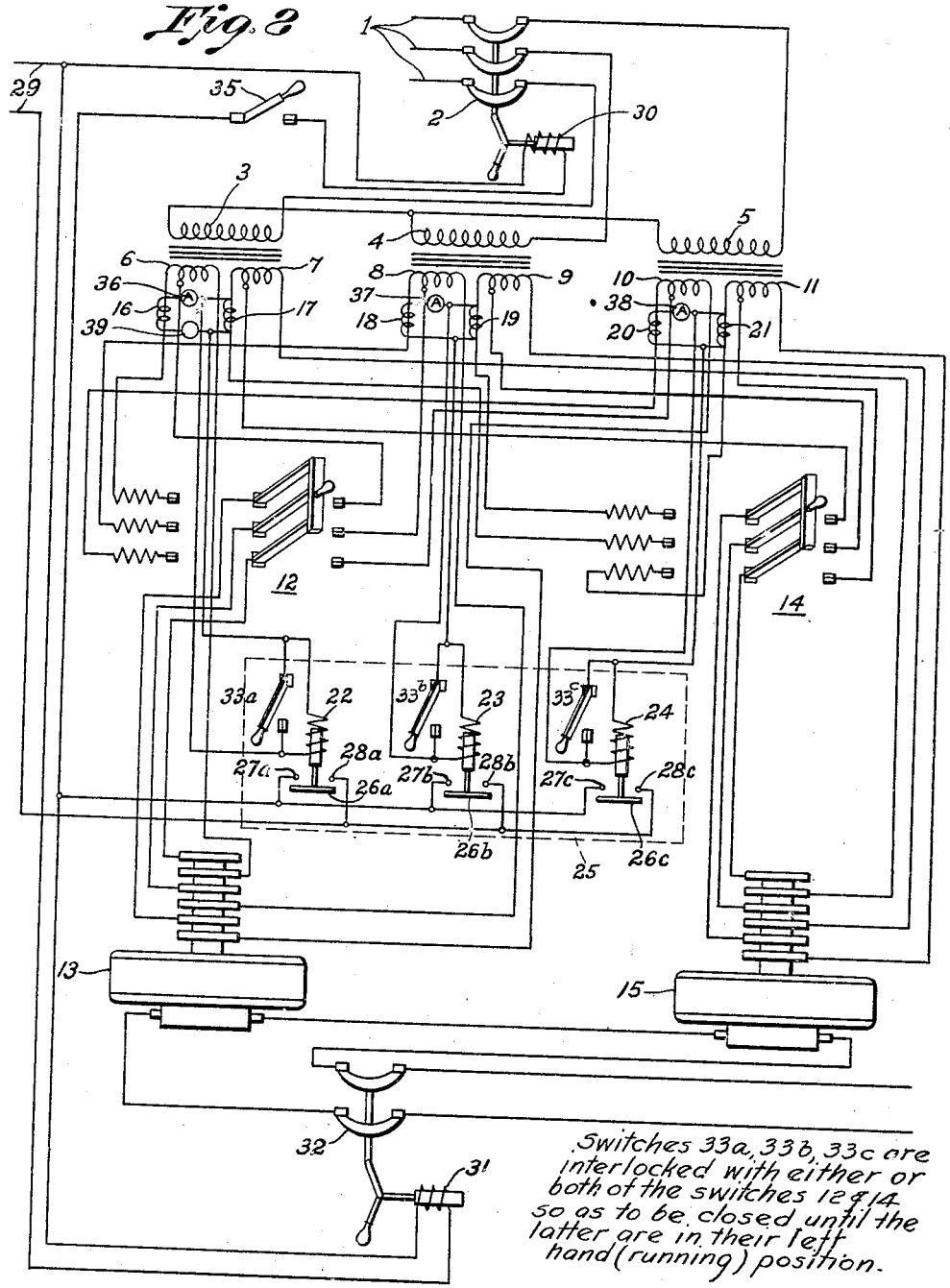

Patented Feb. 4, 1930

1,745,867

UNITED STATES PATENT OFFICE

THOMAS WYLIE ROSS, OF MANCHESTER, ENGLAND, ASSIGNOR TO WESTINGHOUSE ELECTRIC & MANUFACTURING COMPANY, A CORPORATION OF PENNSYLVANIA

ELECTRICAL PROTECTIVE SYSTEM

Application filed October 1, 1926, Serial No. 138,905, and in Great Britain September 30, 1925.

This invention relates to protective arrangements for a pair of electrical converters which are adapted normally to operate in conjunction with one another, for example, with their D. C. windings in series relation.

The protective apparatus, according to the invention, comprises a relay differentially operated in accordance with the currents in corresponding phases of the machines and adapted to control a circuit-interrupter in the circuit of the converters. The operating winding of the relay may be connected across normally equipotential points in a circuit comprising the secondary windings of two current transformers of which the primaries are connected one in a phase of the supply to one machine and the other in the corresponding supply phase of the other machine. Preferably, current transformers are included in every phase of each machine and relay operating coils, corresponding in number to the number of phases of the supply, are provided. Current operating instruments, such as ammeters, current coils of wattmeters or overload relays, may be connected in series in the series circuits comprising the current-transformer secondary windings.

In the accompanying drawings,

Fig. 1 represents, diagrammatically, one way of practicing the invention, as applied to two 6-phase rotary converters energized from a common supply, and Fig. 2 represents, diagrammatically, a modification of the arrangement shown in Fig. 1.

In the system illustrated in Fig. 1, a high-tension 3-phase supply circuit 1 is connected, through an automatic oil switch or circuit-interrupter 2, to the 3-phase primary 3, 4, 5 of a step-down transformer. The transformer is provided with two secondary windings 6 and 7, 8 and 9, 10 and 11 for each phase. One set of secondary windings 6, 8 and 10 is connected, through any suitable form of starting switch 12, shown in the drawing as an ordinary "tap starting" switch, to a 6-phase rotary converter 13, and the other set of secondary windings 7, 9 and 11 is connected, through a similar starting switch 14, to another rotary converter 15, of which the direct-current side is connected in series with that of the first-mentioned rotary converter 13.

Current transformers 16 and 17, 18 and 19, 20 and 21, are placed in corresponding leads of the secondary windings 6 and 7, 8 and 9, 10 and 11 of the several phases. The secondaries of the current transformers 16 and 17 are joined in series, as are also the secondaries of the other current transformers 18 and 19, 20 and 21. Three energizing coils 22, 23 and 24 of a relay 25 are respectively connected across equipotential points of the circuits formed by the secondaries of the current transformers 16 and 17, 18 and 19, 20 and 21.

The relay coils 22, 23 and 24 are arranged to act upon a common armature 26, so that, when any of the three coils are energized, the armature is caused to close contact members 27 and 28 which are connected in series with a source of supply 29 and with the tripping coil 30 of the circuit-interrupter 2 and also with the tripping coil 37 of a circuit-interrupter 32 which is connected in the direct-current output circuit of the rotary converters. Switch contacts 33 and 34 are connected in the common series circuit for a purpose hereinafter referred to. A switch 35 is also connected in the series circuit of the tripping coil 30 and serves the purpose of preventing the energization of this tripping coil when required.

Ammeters 36, 37 and 38, for the purpose of indicating the sum of the currents in corresponding phases of the two machines, are included in the series circuits formed by the secondaries of the current transformers 16 and 17, 18 and 19, 20 and 21, respectively. An overload or thermal relay 39 may be connected in one of the current-transformer secondary circuits and arranged to operate contact members connected similarly to those of the switch 35. The current windings of wattmeters may be similarly connected. Thus, it will be seen that one set of measuring instruments, as well as one protective relay, may serve for the two machines.

It will be seen that, in normal operation, if the machines 13 and 15 are of equal capacity and have equal loads, the currents in corresponding phases of the two machines will be equal and, therefore, no voltage will be impressed on any of the relay coils 22, 23, and 24. Consequently, the relay will not be operated.

If, however, any phase unbalance occurs across either or both machines, or the loading of the two machines is unequal, or a flash-over on the commutator or other fault takes place on one of the machines, or a fault occurs in one of the transformer secondary windings, the currents in at least one of the corresponding phases in the two machines will be unequal. Consequently, a voltage will be impressed upon at least one of the coils 22, 23, 24 of the relay 25, and the relay will be actuated to close its contact members 27 and 28, thereby tripping the circuit-interrupters 2 and 32, assuming that the switch contacts 33, 34 and the switch 35 are all closed. Preferably, the relay 25 is provided with a dashpot or other damping means to obtain an inverse time-lag characteristic.

The switch contacts 33 and 34 are provided in order to prevent tripping of the circuit-interrupters when one machine is started up before the other, and these switches are so connected that, when they are open, they render the closure of the contact members 27 and 28 of the relay 25 ineffective to trip the circuit-interrupters.

The switch contact 33 may be closed only when the starting switch 12 is closed, and the switch contact 34, similarly, may be closed only when the starting switch 14 is closed, so that the two switch contacts 33, 34 are interlocked with the starting switches and cannot be closed until the latter have been moved to their running positions and the machines 13 and 15 are running normally. Thus, the relay 25 is rendered unable to cause the opening of the circuit-interrupter 2, when one machine is started up before the other.

It will be appreciated that but a single switch like 33 or 34 may be used and that this may be interlocked with the starting switch of that machine which is to be started up last.

In the modified arrangement illustrated in Fig. 2, the relay operating coils 22, 23 and 24 co-operate with separate armatures 26a, 26b, and 26c, to form three distinct relays. The contact members 27a, 27b, and 27c of these relays are connected together and also the contact members 28a, 28b and 28c are connected together, so that the arrangement is the equivalent of that shown in Fig. 1.

The switches 33 and 34 of Fig. 1 are omitted and instead switches 33a, 33b, and 33c are so arranged that, when closed, they short-circuit the operating coils 22, 23 and 24, respectively, and thus prevent their energization. The switches 33a, 33b and 33c may be interlocked mechanically or electrically, in any known manner with the starting switch of that machine which is started up last so that they are maintained closed until the said starting switch is actuated to its normal running position. The three relays should, of course, have inverse time-lag characteristics.

If desired, additional switches may be provided in parallel with the switches 33a, 33b and 33c, respectively, and the parallel-connected switches may be interlocked with the starting switches of the two machines so that, until both machines have started, the relays are rendered ineffective.

It will be appreciated that the above description is given by way of example only and that many modifications may be made without departing from the scope of this invention, as defined by the appended claims.

I claim as my invention:

1. A protective system for a pair of rotary converters normally operated in conjunction with each other and having individual starting switches, comprising a relay responsive to the difference in currents in corresponding phases of the machines, and a protective circuit controlled by the relay, and by interlock contacts on the starting switches.

2. A protective system for a pair of rotary converters normally operated in conjunction with each other and having individual starting means comprising a relay responsive to the difference in currents in corresponding phases of the machines, and circuit-interrupting means in the supply circuit of both machines controlled by the relay, in cooperation with interlock contacts actuated by said starting means.

3. A protective system for a pair of rotary converters normally operated in conjunction with each other including a relay responsive to the difference in currents in corresponding phases of the machines, and circuit-interrupters in the supply and load circuits of both machines controlled by the relay.

4. A protective system for a pair of rotary converters normally operated in conjunction with each other including a pair of current transformers in corresponding phases of the machines, a relay having an operating winding connected between normally equipotential points in a circuit which includes the secondary windings of both of said transformers, and protective apparatus controlled by the relay.

5. A protective system for a pair of rotating machines normally operated in conjunction with each other and provided with starting switches including a relay responsive to abnormal electrical conditions in the circuits of the two machines, and means interlocked with the starting switches for rendering the relay ineffective during the starting operation.

6. A protective system for a translating station having a plurality of units adapted to be connected in parallel to a polyphase alternating-current supply source and in series to a load circuit, including means responsive to an unbalance of the currents taken by said units from each phase of the source, for disconnecting said units from both the supply source and the load circuit.

7. A protective system for a translating station having a plurality of units adapted to be connected in parallel to a polyphase alternating-current supply source and in series to a load circuit, including a relay and means for energizing said relay in proportion to the difference between the currents taken by said units from each of the phases of said source, and circuit interrupters controlled by said relay for disconnecting said units from the supply source and the load circuit.

8. The combination with a translating station including a plurality of units adapted to be connected in parallel to a polyphase alternating-current supply source and in series to a load circuit, of protective means comprising a relay, means for energizing said relay in proportion to the difference between the currents taken by said units from each phase of the source, circuit interrupters controlled by said relay for disconnecting said units from the supply source and the load circuit, starting equipment for said units and means controlled thereby for rendering said relay ineffective to control said interrupters.

In testimony whereof, I have hereunto subscribed my name this second day of September, 1926.

THOMAS WYLIE ROSS.